United States Patent
Cerro

(10) Patent No.: US 12,011,684 B1
(45) Date of Patent: Jun. 18, 2024

(54) FILTER ASSEMBLY FOR AIR MOVING SYSTEM

(71) Applicant: Darryl Cerro, Mooresville, NC (US)

(72) Inventor: Darryl Cerro, Mooresville, NC (US)

(*) Notice: Subject to any disclaimer, the term of this patent is extended or adjusted under 35 U.S.C. 154(b) by 0 days.

(21) Appl. No.: 18/471,093

(22) Filed: Sep. 20, 2023

Related U.S. Application Data

(63) Continuation-in-part of application No. 17/174,966, filed on Feb. 12, 2021, now abandoned.

(51) Int. Cl.
*B01D 46/30* (2006.01)
*B01D 46/00* (2022.01)

(52) U.S. Cl.
CPC ......... *B01D 46/30* (2013.01); *B01D 46/0004* (2013.01); *B01D 2101/02* (2013.01)

(58) Field of Classification Search
None
See application file for complete search history.

(56) References Cited

U.S. PATENT DOCUMENTS

| | | | | |
|---|---|---|---|---|
| 2,978,064 A | * | 4/1961 | Deaver | B01D 39/2072 96/151 |
| 3,675,394 A | * | 7/1972 | Sterrett | B01D 46/30 55/518 |
| 4,227,904 A | * | 10/1980 | Kasmark, Jr. | B01D 46/0001 55/498 |
| 4,699,681 A | * | 10/1987 | Kasmark, Jr. | B01D 46/30 427/244 |
| 5,746,914 A | * | 5/1998 | Hanna | B01D 53/06 210/488 |
| 7,090,713 B2 | * | 8/2006 | Terlson | B01D 46/521 55/497 |

(Continued)

FOREIGN PATENT DOCUMENTS

| | | | |
|---|---|---|---|
| EP | 0963776 A1 | * 12/1999 | |
| GB | 2583165 A | * 10/2020 | B01D 25/02 |

(Continued)

OTHER PUBLICATIONS

Process Systems, Mesh Sizing Chart, Jan. 22, 2022, Process Systems, all pages https://web.archive.org/web/20220122150134/https://www.valvesonline.com.au/references/mesh-sizing-chart/ (Year: 2022).*

(Continued)

*Primary Examiner* — Brit E. Anbacht
(74) *Attorney, Agent, or Firm* — QuickPatents; Kevin Prince

(57) ABSTRACT

The present invention is a filter assembly that aids in removal of undesirable gases and/or vapors from air, particularly air moving through HVAC systems. The filter assembly includes a frame having first and second sides that each include a mesh layer through which air may flow, the frame containing a particulate filter media (e.g., activated charcoal particles) contained loosely between the mesh layers. Suspension of the particulate filter media in the air moving through filter assembly enhances contact of the air with the surface of the particulate filter media and removal of undesirable vapors and/or gases from the air. The filter assembly is configured to work in conjunction with conventional dust filters without requiring modification of HVAC systems. The filter assembly may be refilled with particulate filter media.

11 Claims, 8 Drawing Sheets

(56) References Cited

U.S. PATENT DOCUMENTS

| | | | | |
|---|---|---|---|---|
| 7,563,301 B2 * | 7/2009 | Hauville | ............ | B01D 46/0002 |
| | | | | 55/516 |
| 2002/0139746 A1 * | 10/2002 | Koslow | ............. | B01J 20/28004 |
| | | | | 210/488 |
| 2008/0115670 A1 * | 5/2008 | Hauville | ................ | B01D 46/30 |
| | | | | 96/131 |
| 2009/0025561 A1 * | 1/2009 | Tuma | ................ | B01D 46/0001 |
| | | | | 96/151 |
| 2016/0129383 A1 * | 5/2016 | Volk | ................ | F02M 35/02483 |
| | | | | 96/135 |
| 2016/0354729 A1 * | 12/2016 | Krishna | ................ | B01D 71/56 |
| 2018/0333672 A1 * | 11/2018 | Moulton | ................ | B01D 53/12 |
| 2022/0258089 A1 * | 8/2022 | Cerro | .................... | B01D 39/12 |

FOREIGN PATENT DOCUMENTS

| | | | | |
|---|---|---|---|---|
| KR | 20140039426 | A | * | 4/2014 |
| KR | 20220070928 | A | * | 5/2022 |

OTHER PUBLICATIONS

NPL translation of KR 20220070928 (Year: 2022).*
NPL translation of KR 20140039426 (Year: 2014).*
NPL translation of GB 2583165 (Year: 2020).*
NPL translation of EP 0963776 (Year: 1999).*

* cited by examiner

FILTER ASSEMBLY FOR AIR MOVING SYSTEM

CROSS-REFERENCE TO RELATED APPLICATIONS

This application is a continuation-in-part claiming the benefit of U.S. patent application Ser. No. 17/174,966, filed on Feb. 12, 2021, now U.S. Patent Application Publication No. US2022/0258089, all of which is incorporated herein by reference.

STATEMENT REGARDING FEDERALLY SPONSORED RESEARCH AND DEVELOPMENT

Not Applicable.

FIELD OF THE INVENTION

This invention relates to filters or filtering processes specially modified for separating gases or vapors, and more particularly to filters using loose particulate filtering material.

BACKGROUND

There has long been a need for a means to filter indoor house air for health reasons and for odor reasons. Typically, homeowners have used dust filtration to remove airborne particulates from heating, ventilation and air conditioning (HVAC) systems; however, such HVAC filtration technology largely fails to remove undesirable odors and chemical contaminants from the indoor house air. While various room air filtration units have become common on the market, there remains a need for HVAC air filtration technologies that provide effective and convenient filtration of indoor house air to remove undesirable gaseous and/or vapor contaminants. The present invention accomplishes these objectives.

SUMMARY OF THE INVENTION

The present invention is an article that aids in the removal of undesirable gases and/or vapors from air, particularly air moving through HVAC systems. Further, the present article can be used alone or in combination with a conventional dust filter.

In one aspect, the invention includes a filter assembly including a frame having first and second sides that each include a mesh layer through which air may flow, the frame containing a particulate filter media contained loosely within the frame. The particulate filter media may be, for example, activated charcoal particles. Additional features and uses of the filter assembly are described herein.

Advantageously, the filter assembly is useful for an air moving system of a type having a filter space for the filter assembly, wherein the air moving system is configured to cause air to flow upwards through a horizontally oriented filter assembly in a manner effective to suspend the particulate filter media contained in the filter assembly. Suspension of the particulate filter media in the air is selected for enhancing contact of the air with the surface of the particulate filter media, and thereby enhancing removal of undesirable vapors and/or gases from the air. The filter assembly is configured to work in conjunction with conventional dust filters in the air moving system, if desired. The filter assembly may be conveniently replaced as needed.

A further advantage of the invention is that the filter assembly of the invention can be used in an HVAC system in addition to an existing dust filter, without requiring modification of the HVAC system. The filter assembly is made to be easy to install and remove, with an option to replace filter material inside the filter assembly and thereby extend the effective life of the filter assembly.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

The term "granule size" as used herein refers to largest axis (e.g., diameter of a spherical particle) of the granule. Granule size, or particle size, may also be described with reference to the weight average particle size, as will be understood by those skilled in the art.

Figure 1:
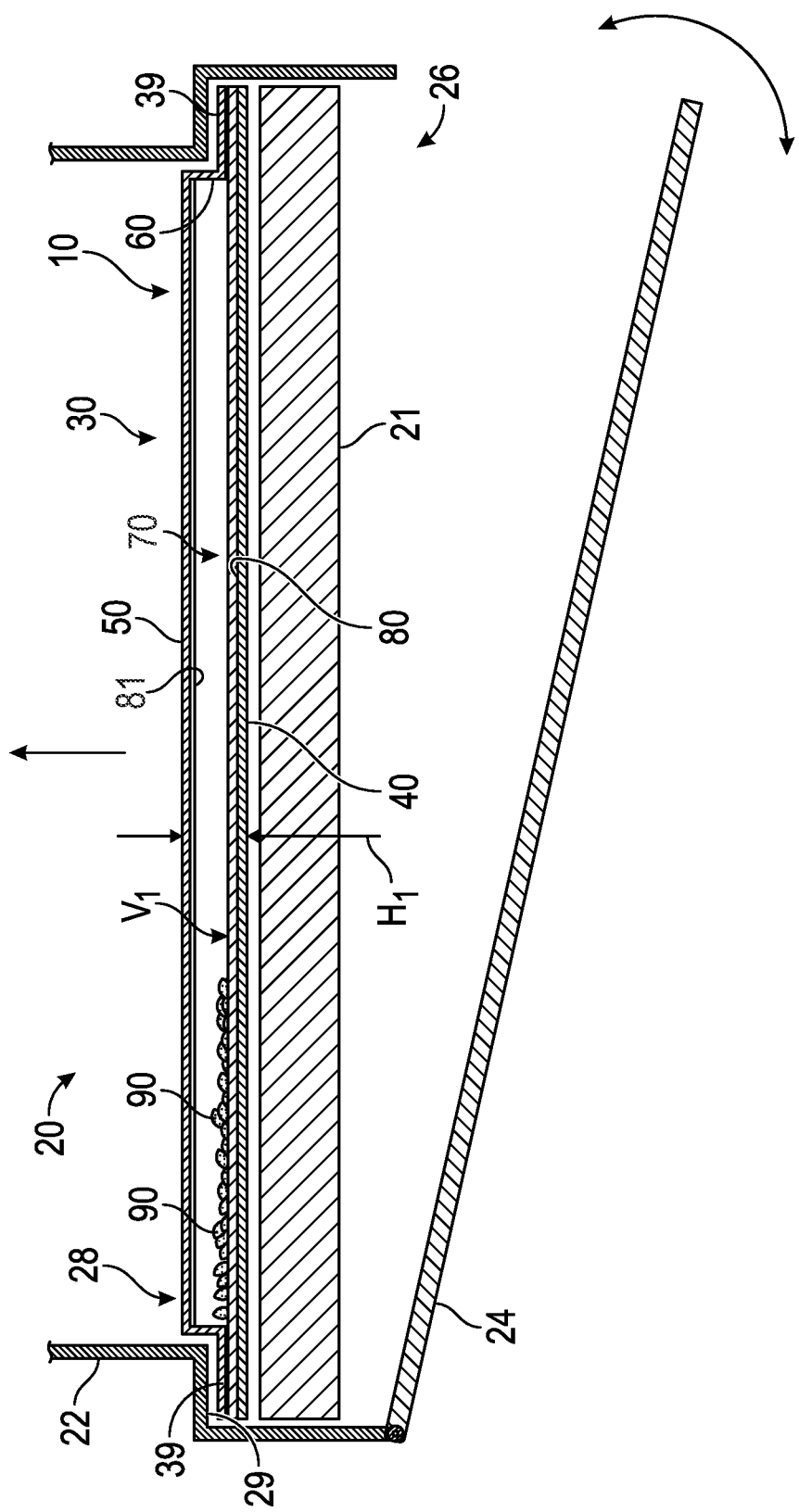
FIG. 1 is a schematic lateral sectional view of a filter assembly according to the invention.
Figure 4:
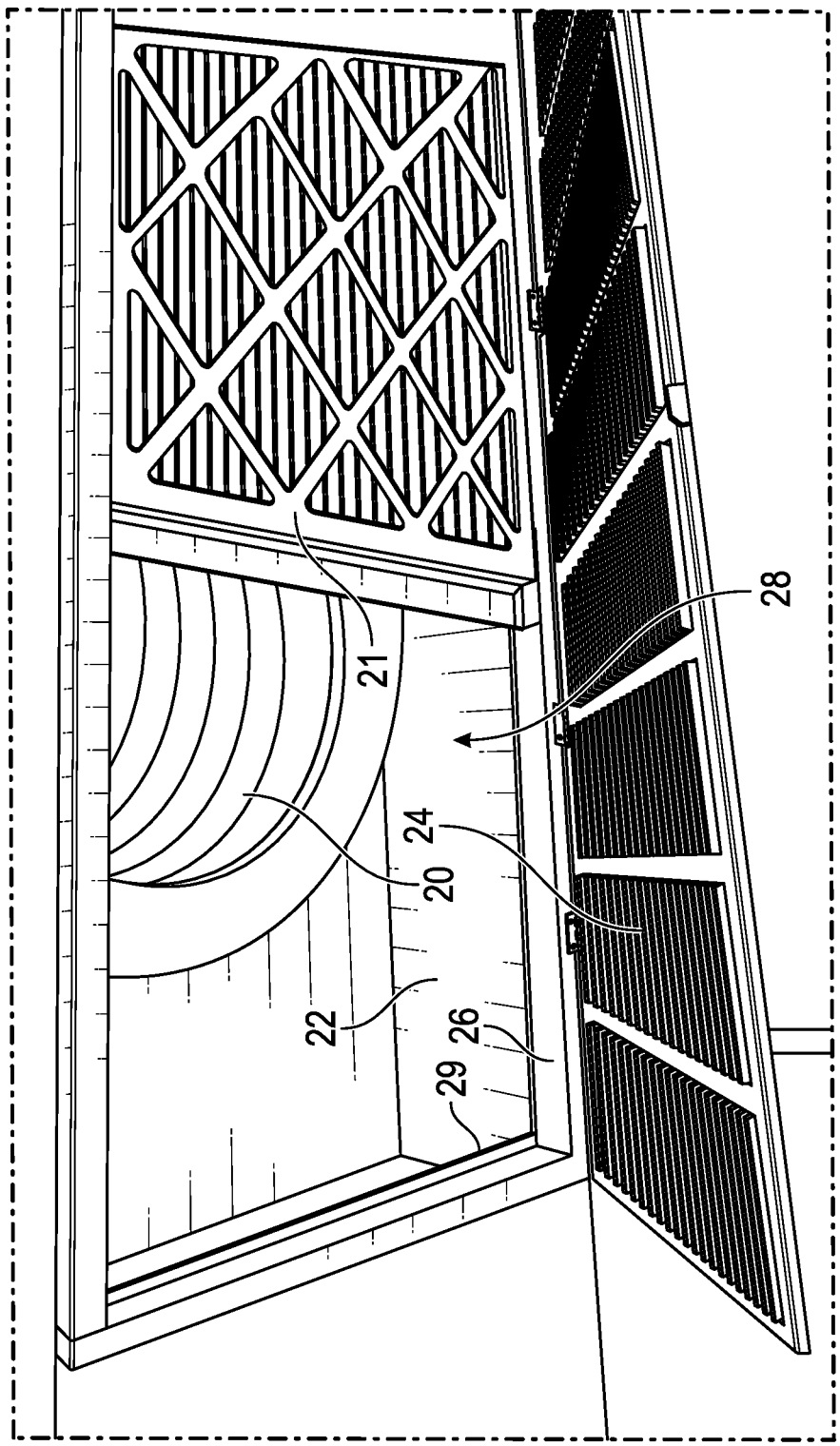
FIG. 4 is a schematic view of an air inlet system, with door open to receive a filter assembly according to the invention.

The present invention includes a filter assembly 10 for an air moving system 20 (see FIG. 1). The filter assembly 10 is of the type having an air inlet structure 22 that includes a door 24 selectively covering a filter space 26, and an air inlet port 28 having an inwardly-projecting flange 29 (see FIG. 4).

The filter assembly 10 includes a frame 30 having a first side 40, a second side 50, and a peripheral edge 60 connecting the first side 40 with the second side 50 (see FIG. 1). The first side 40, second side 50 and peripheral edge 60 together all define an interior space 70 and having a height $H_1$ about equal to a height of the peripheral edge 60. In some embodiments of the invention, the interior space 70 may be continuous so as to avoid having "dead zones" in the filter assembly 10 that air does not pass through easily. In some embodiments of the invention, the height $H_1$ of peripheral edge 60 is at least about 0.5 inches (1.3 cm). In some embodiments of the invention height $H_1$ may be in a range from about 0.5 inches (1.3 cm) to about 2 inches (5 cm). The first side 40 includes a first mesh layer 80 and the second side 50 includes a second mesh layer 81, and air may flow through first mesh layer 80 and second mesh layer 81. In some embodiments of the invention, the mesh layers 80 and 81 may comprise a thermoplastic material, for example, a nylon material. Alternately, the mesh layers 80, 81 may be made with a metallic screen material, or other suitable material for forming a mesh. The first side 40 includes an outwardly-projecting flange 39 configured to engage the inwardly-projecting flange 29 of the air inlet port 28.

Figure 2:
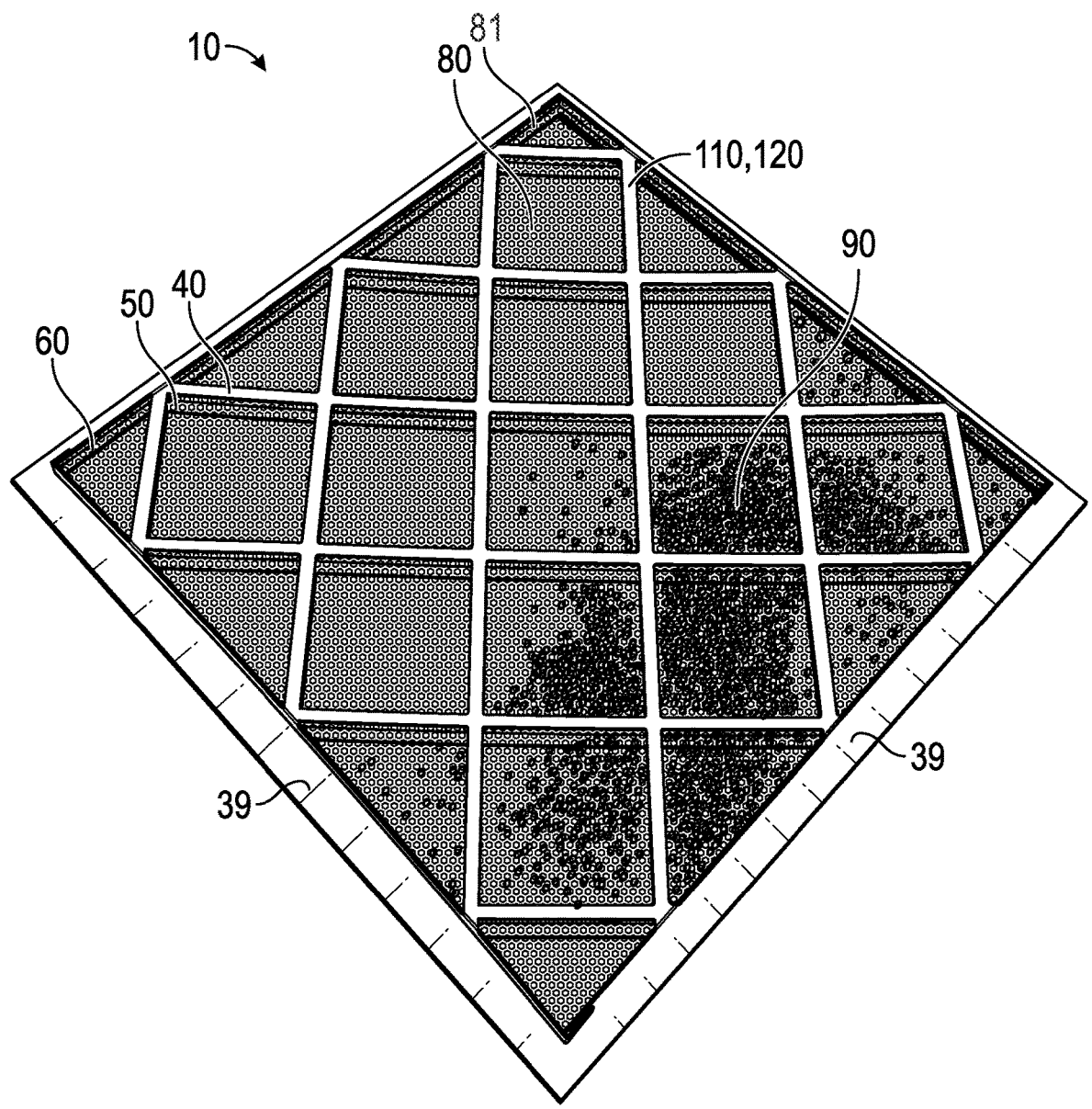
FIG. 2 is a schematic top perspective view of a filter assembly according to the invention.

The filter assembly 10 includes a particulate filter media 90 loosely contained within the interior space 70, the particulate filter media 90 covering between about 15% and 40% of the first side 40 in a single layer when the air moving system 20 is deactivated and filter assembly 10 is oriented horizontally with side 40 facing downwards (see FIGS. 1 and 2). In some embodiments of the invention, the particulate filter media 90 may include a granular activated carbon having an average granular size of between 0.6 mm to 1.0 mm. In some embodiments of the invention, the granule activated carbon may have an irregular, non-spherical surface.

When the frame 30 is engaged within the air inlet port 28 and with the air moving system 20 activated, air flows through the first mesh layer 80, then across the particulate filter media 90, and then through the second mesh layer 81, the particulate filter media 90 is jostling around in an air stream within the interior space 70 (particularly when filter assembly 10 is in a horizontal orientation with side 40 facing downwards), making an audible clicking noise as the particulate filter media 90 collides in the air stream, and thereby the particulate filter media 90 filters the air stream. The clicking noise helps users near the filter assembly 10 perceive that the filter assembly 10 and the air moving system 20 are working.

In some embodiments of the invention, the filter assembly 10 may further include a fill aperture 100 (FIG. 3) formed through the peripheral edge 60 through which the particulate filter media 90 may be emptied and refilled from the interior space 70. The filter assembly 10 may further including a selectively removable cover 105 for the fill aperture 100.

Figure 6:
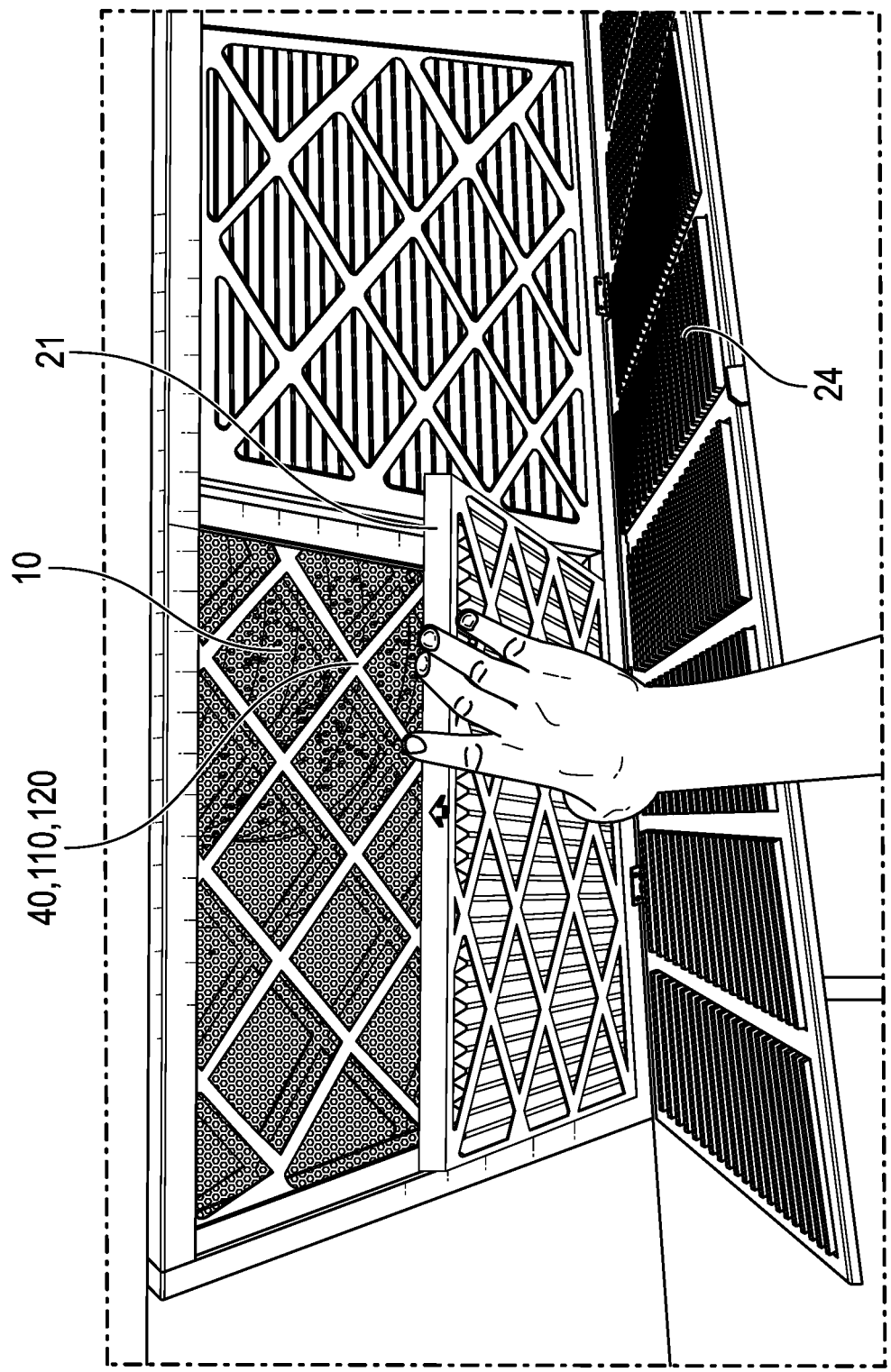
FIG. 6 is a schematic view of an air inlet system, with door open to show an installed filter assembly according to the invention, and showing installation of a dust filter over the filter assembly.
Figure 7:
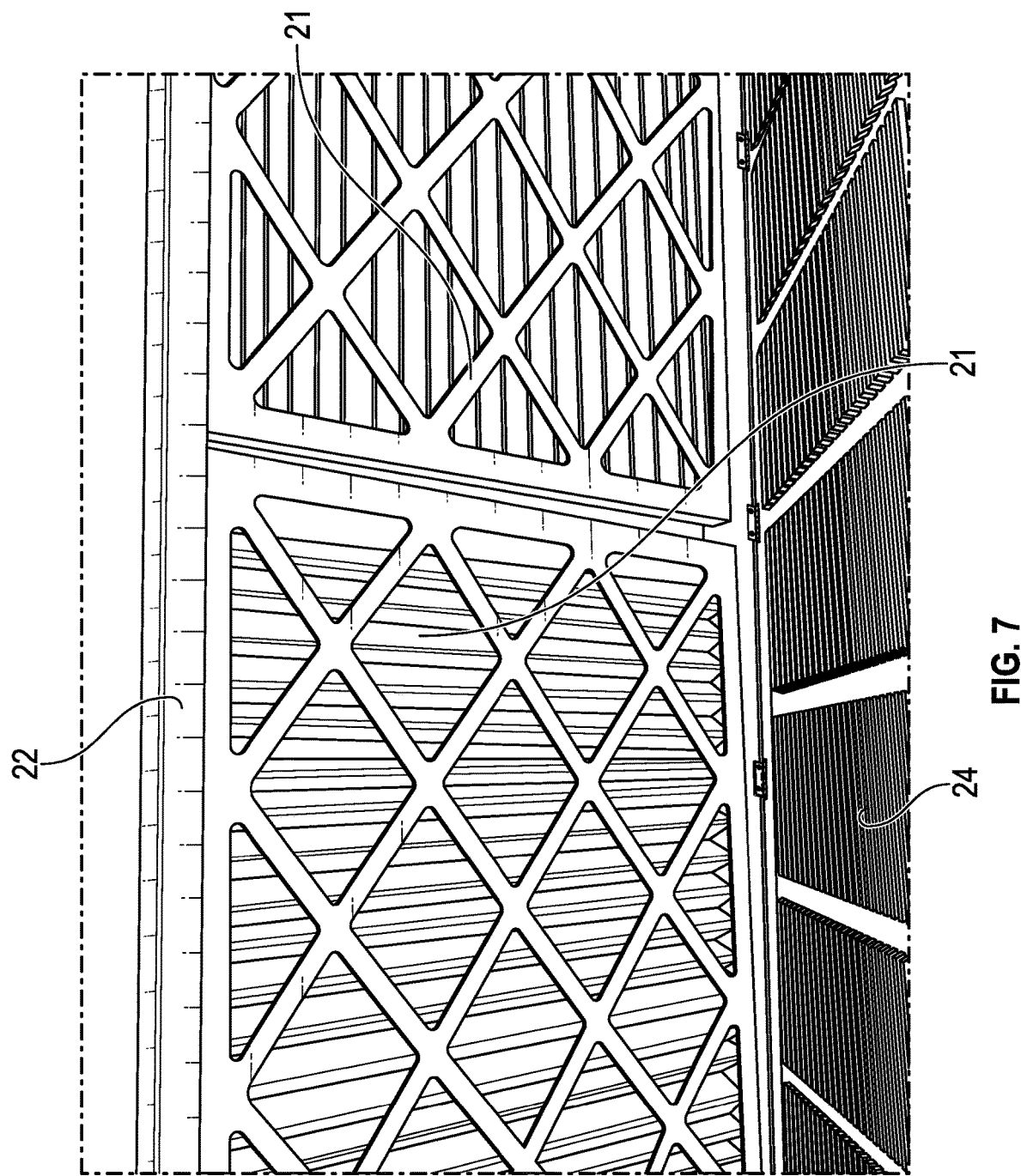
FIG. 7 is a schematic view of an air inlet system, with door open to show installed dust filters after installing a dust filter to abut an installed filter assembly according to the invention (installed filter assembly hidden behind the dust filter)

In some embodiments of the invention, the outwardly-projecting flange 39 may be integrally formed with the first side 40 of the frame, whereby a dust filter 21 may be abutted against the first side 40 within the filter space with room for the door 24 to be closed over the dust filter 21 and the filter assembly 10 (see FIGS. 6 and 7).

In some embodiments of the invention, the first side 40 may further include a grid layer 110 and the second side 50 may further include a second grid layer 111 wherein the first grid layer 110 and the second grid layer 111 are arranged to support the first mesh layer 80 and the second mesh layer 81, respectively. Air can flow through openings in the first grid layer 110 and the second grid layer 111 (see FIGS. 2 and 3). The first grid layer 110 and the second grid layer 111 serve to keep the first mesh layer 80 and the second mesh layer 81 from billowing out when air is flowing through filter assembly 10. In some embodiments of the invention, the first grid layer 110 and the second grid layer 111 comprise a suitable reinforcing material 120. In some embodiments, the suitable reinforcing material 120 may be a paper card stock material, recyclable plastic material such as ABS, PVC, polyurethane, or the like. In some embodiments the reinforcing material 120 is made from a fire resistant material.

In some embodiments of the invention, the first side 40 of the frame 30 and the peripheral edge 60 may be integrally formed and adhered with the second side 50 of the frame 30 at the outwardly-projecting flange 39. Any suitable adherent may be used, for example, a glue, including a hot melt glue.

In some embodiments of the invention, first side 40 and second side 50 may independently be of any suitable shape and dimension for an HVAC system, for example rectangular as shown in the figures, with dimensions of 16 inches (41 cm) by 24 inches (61 cm), as commonly found in conventional HVAC systems.

Figure 3:
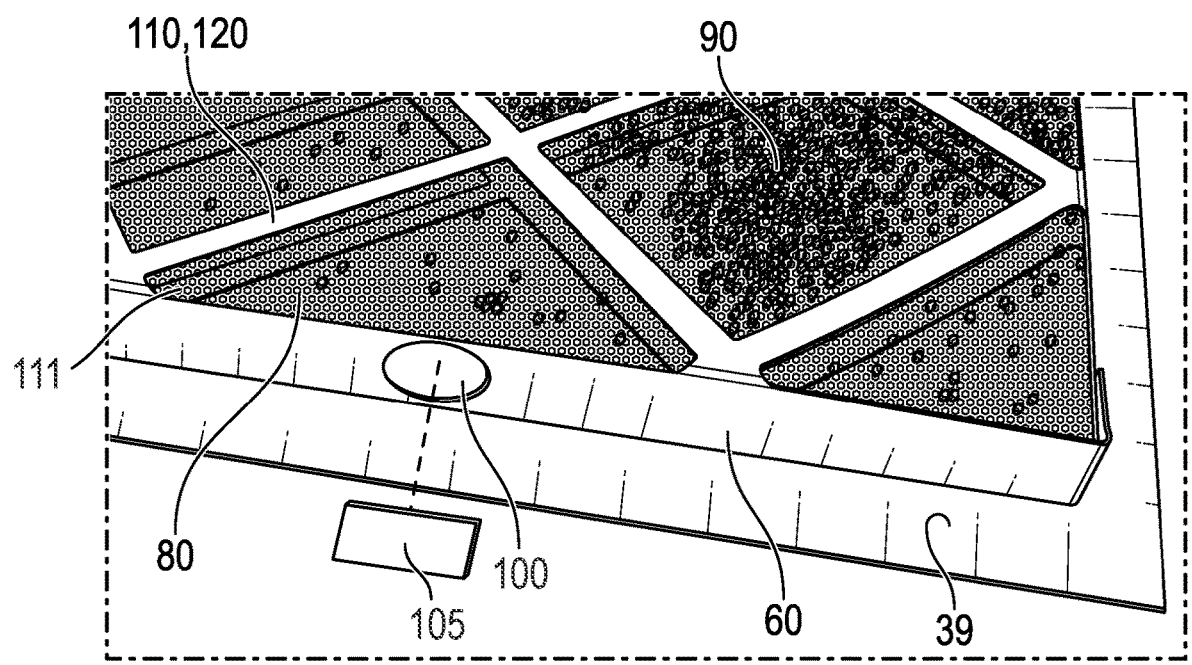
FIG. 3 is a schematic top perspective view of a corner region of a filter assembly according to the invention.
Figure 5:
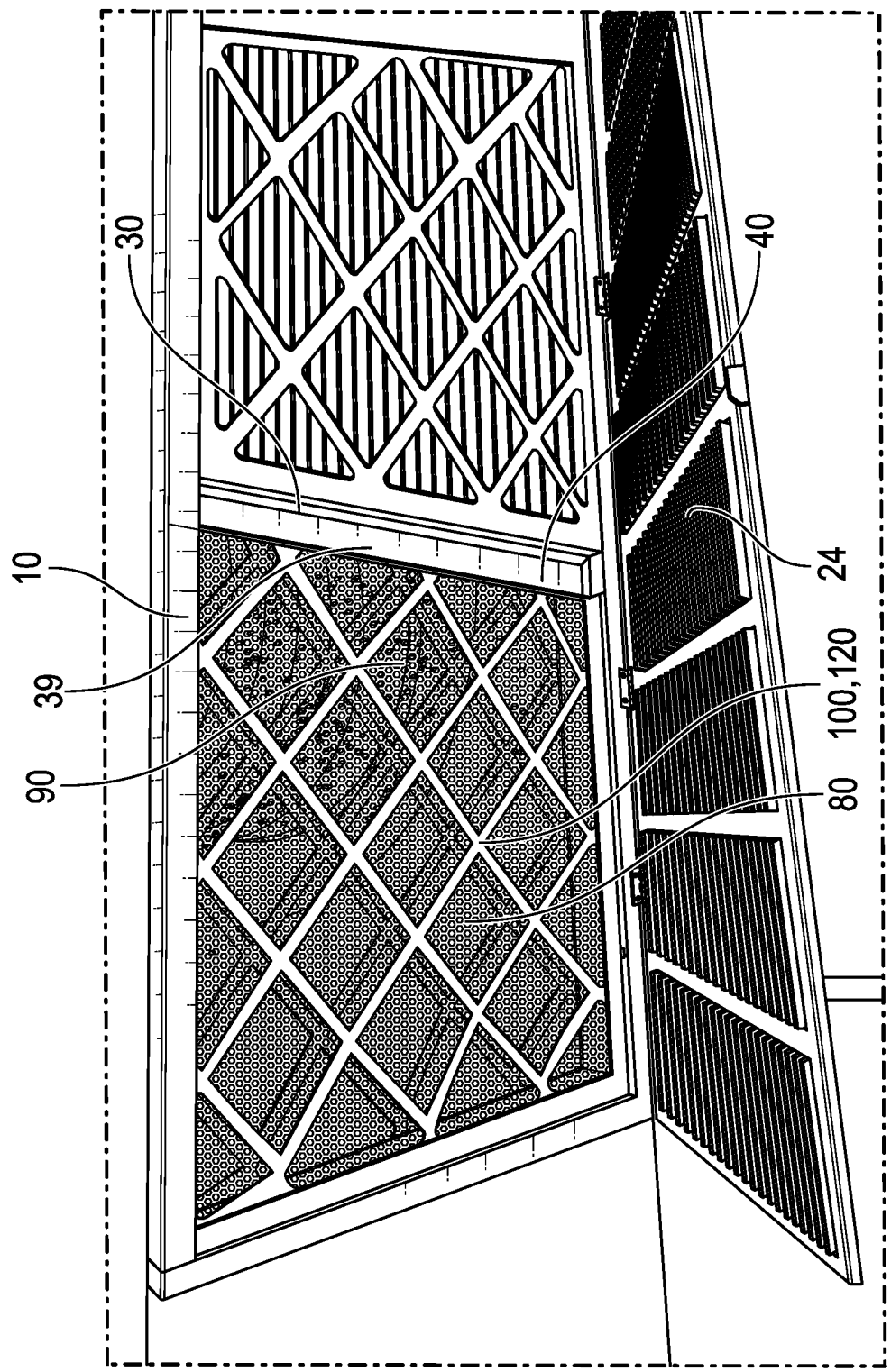
FIG. 5 is a schematic view of an air inlet system, with door open to show an installed filter assembly according to the invention.
Figure 8:
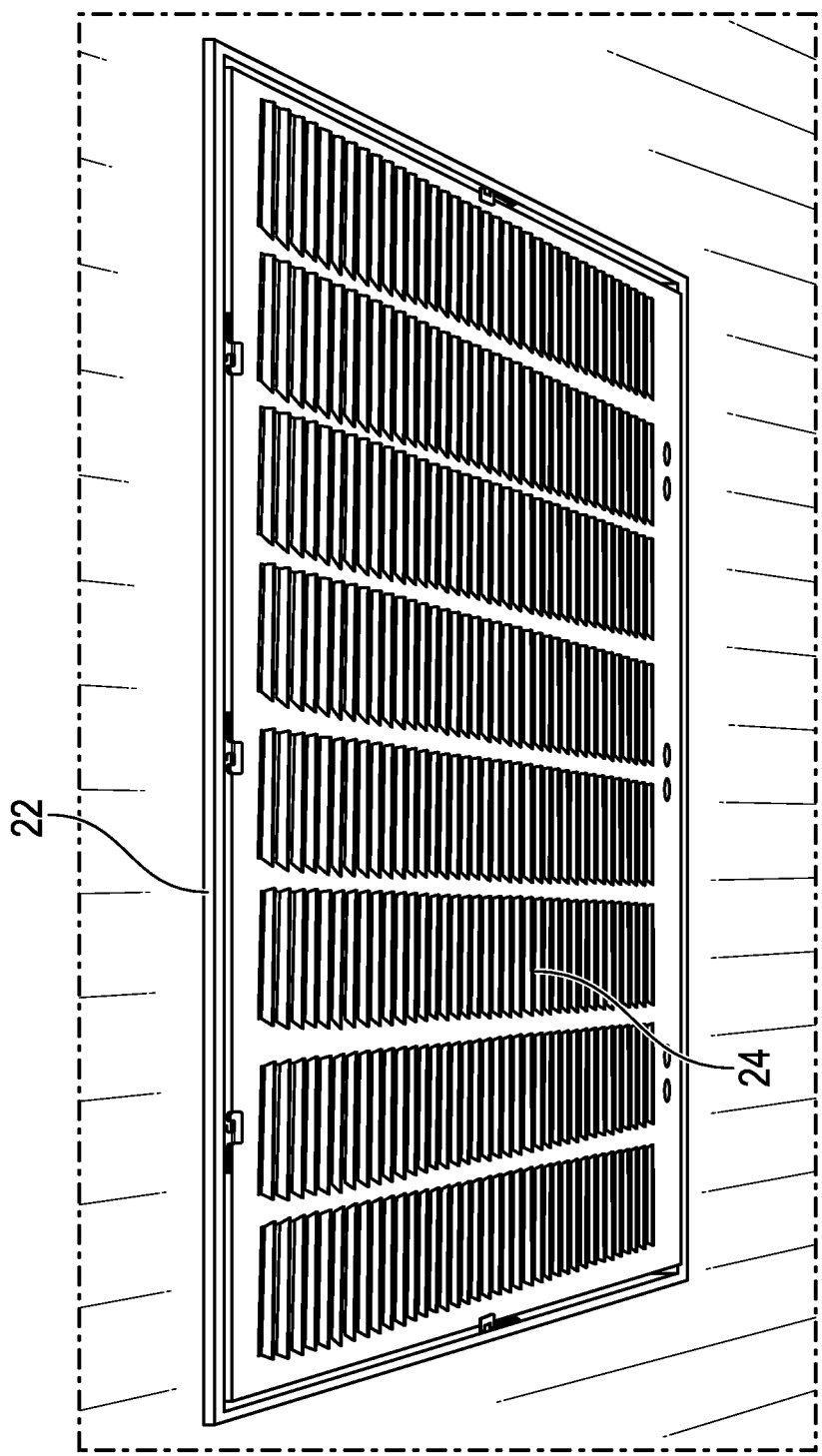
FIG. 8 is a schematic view of an air inlet system, with a door closed after installation of a filter assembly according to the invention.

In some embodiments, the invention includes a filter assembly 10 for an air moving system 20 of the type having an air inlet structure 22 that includes a door 24 selectively covering a filter space 26, and an air inlet port 28 having an inwardly-projecting flange 29 (see FIG. 4), the filter assembly 10 including:
  a frame 30 including a first side 40, a second side 50, and a peripheral edge 60 connecting the first side 40 with the second side 50, the first side 40, second side 50, and peripheral edge 60 all defining a continuous interior space 70 and having a height $H_1$ equal to a height of the peripheral edge of between 0.5 inch and 2.0 inch, or 0.5 inch and 1.0 inch, the first side 40 including an outwardly-projecting flange 39 configured to engage the inwardly-projecting flange 29 of the air inlet port 28; wherein the first side 40 comprises a first mesh layer 80 and the second side 50 comprises a second mesh layer 81, and wherein air can flow through the first mesh layer 80 and the second mesh layer 81; and
  a particulate filter media 90 loosely contained within the interior space 70, the particulate filter media 90 covering between 15% and 40% of the first side 40 in a single layer when the air moving system 20 is deactivated (particularly when filter assembly 10 is in a horizontal orientation with side 40 facing downwards), the particulate filter media 90 including granular activated carbon having an average granular size of between 0.6 mm to 1.0 mm; and
  a fill aperture 100 formed through the peripheral edge 60 through which the particulate filter media 90 may be emptied and refilled from the interior space 70, the filter assembly 10 further including a selectively removable cover 105 for the fill aperture 100;

wherein the outwardly-projecting flange 39 is integrally formed with the first side 40 of the frame, whereby a dust filter 21 may be abutted against the first side 40 within the filter space 70 with room for the door 24 to be closed over the dust filter 21 and the filter assembly 10 (see FIGS. 6-8);

wherein the first side further 40 comprises a first grid layer 110 and the second side 50 further comprises a second grid layer 111, wherein the first grid layer 110 and the second grid layer 111 are arranged to support the first mesh layer 80 and the second mesh layer 81, respectively; wherein the first grid layer 110 and the second grid layer 111 comprise a suitable reinforcing material 120, and wherein air can flow through openings in the first grid layer 80 and the second grid layer 81 (see FIGS. 2, 3, and 5);

whereby with the frame 30 engaged within the air inlet port 28 and with the air moving system 20 activated, air flows through the first mesh layer 80, then through the particulate filter media 90, and then through the second mesh layer 81, the particulate filter media 90 jostling around in an air stream within the interior space 70, making an audible clicking noise as the particulate filter media 90 collides in the air stream, the particulate filter media 90 filtering the air stream.

In some embodiments of the invention, a method of filtering air includes passing air through embodiments of the filter assembly 10. In some embodiments, filter assembly is oriented horizontally with first side 40 facing downwards. The method may include moving air through filter assembly 10 installed within air moving system 20, thereby bringing the air into contact with particulate filter media 90. In some embodiments, air moving system 20 may include a vacuum system for moving air through filter assembly 10. In some embodiments of the method, air moving system may include a blower for moving air through the filter assembly 10. In some embodiments, the method may include passing the air through a path of a plurality (i.e., two or more) of filter assemblies 10. In some embodiments of the invention, the method may include capturing a gaseous and/or vapor component(s) of the air by the particulate filter media 90 within filter assembly 10. Examples of gaseous and/or vapor component(s) of the air may include various airborne chemical contaminants, for example household cleaners, smoke, and other odorous or irritant materials (including respiratory irritants).

In some embodiments of the invention, a method of using filter assembly 10 includes adding particulate filter media 90 into interior space 70 via a fill aperture 100 and capping the fill aperture 100 with selectively removable cover 105. In another embodiment, a method of using filter assembly 10 includes removing selectively removable cover 105 from filter assembly 10 and pouring or otherwise removing particulate filter media 90 from interior space 70 via fill aperture 100.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention. Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A filter assembly for an air moving system of the type having an air inlet structure that includes a door selectively covering a filter space, and an air inlet port having an inwardly-projecting flange, the filter assembly comprising:

a frame comprising a first side, a second side, and a peripheral edge connecting the first side with the second side, the first side, second side, and peripheral edge all defining an interior space and having a height equal to a height of the peripheral edge, the first side including an outwardly-projecting flange configured to engage the inwardly-projecting flange of the air inlet port, the first side comprising a first mesh layer and the second side comprising a second mesh layer, wherein air can flow through the first mesh layer and the second mesh layer; and a particulate filter media loosely contained within the interior space, the particulate filter media covering between 15% and 40% of the first side in a single layer when the air moving system is deactivated;

whereby with the frame engaged within the air inlet port and with the air moving system activated, air flows through the first mesh layer, then across the particulate filter media in the interior space, and then through the second mesh layer, the particulate filter media jostling around in an air stream within the interior space, making an audible clicking noise as the particulate filter media collides in the air stream, the particulate filter media filtering the air stream.

2. The filter assembly of claim 1 further including a fill aperture formed through the peripheral edge through which the particulate filter media may be emptied and refilled from the interior space, the filter assembly further including a selectively removable cover for the fill aperture.

3. The filter assembly of claim 1 wherein the height of the peripheral edge is at least 0.5 inches.

4. The filter assembly of claim 1 wherein the first mesh layer and the second mesh layer each comprise a nylon material.

5. The filter assembly of claim 1 wherein the interior space is continuous.

6. The filter assembly of claim 1 wherein the outwardly-projecting flange is integrally formed with the first side of the frame, whereby a dust filter may be abutted against the first side within the filter space with room for the door to be closed over the dust filter and the filter assembly.

7. The filter assembly of claim 1 wherein the particulate filter media includes granular activated carbon having an average granular size of between 0.6 mm to 1.0 mm.

8. The filter assembly of claim 1 wherein the first side further comprises a first grid layer and the second side further comprises a second grid layer, wherein the first grid layer and the second grid layer are arranged to support the first mesh layer and the second mesh layer, respectively, wherein the first grid layer and the second grid layer comprise a suitable reinforcing material; and wherein air can flow through openings in the first grid layer and the second grid layer.

9. The filter assembly of claim 8 wherein the suitable reinforcing material comprises a paper card stock material.

10. The filter assembly of claim 9 wherein the first side of the frame and the peripheral edge are integrally formed and adhered with the second side of the frame at the outwardly-projecting flange.

11. A filter assembly for an air moving system of the type having an air inlet structure that includes a door selectively covering a filter space, and an air inlet port having an inwardly-projecting flange, the filter assembly comprising:

a frame comprising a first side, a second side, and a peripheral edge connecting the first side with the second side, the first side, second side, and peripheral edge all defining a continuous interior space and having a height equal to a height of the peripheral edge of between 0.5-1.0 inch, the first side including an outwardly-projecting flange configured to engage the inwardly-projecting flange of the air inlet port, wherein the first side comprises a first mesh layer and the second side comprises a second mesh layer, and wherein air can flow through the first mesh layer and the second mesh layer;

a particulate filter media loosely contained within the interior space, the particulate filter media covering between 15% and 40% of the first side in a single layer when the air moving system is deactivated, the particulate filter media including granular activated carbon having an average granular size of between 0.6 mm to 1.0 mm; and a fill aperture formed through the peripheral edge through which the particulate filter media may be emptied and refilled from the interior space, the filter assembly further including a selectively removable cover for the fill aperture;

wherein the outwardly-projecting flange is integrally formed with the first side of the frame, whereby a dust filter may be abutted against the first side within the filter space with room for the door to be closed over the dust filter and the filter assembly;

wherein the first side further comprises a first grid layer and the second side further comprises a second grid layer, wherein the first grid layer and the second grid layer are arranged to support the first mesh layer and the second mesh layer, respectively, wherein the first grid layer and the second grid layer comprise a suitable support material, and wherein air can flow through openings in the first grid layer and the second grid layer;

whereby with the frame engaged within the air inlet port and with the air moving system activated, air flows through the first mesh layer, then through the particulate filter media, and then through the second mesh layer, the particulate filter media jostling around in an air stream within the interior space, making an audible clicking noise as the particulate filter media collides in the air stream, the particulate filter media filtering the air stream.

* * * * *